(12) United States Patent
Geest et al.

(10) Patent No.: US 8,343,242 B2
(45) Date of Patent: Jan. 1, 2013

(54) METHOD OF CONTROLLING AN APPARATUS FOR GENERATING ELECTRIC POWER AND APPARATUS FOR USE IN SAID METHOD

(75) Inventors: Claus Geest, Jelling (DK); Bjørn Teislev, Silkeborg (DK)

(73) Assignee: Babcock & Wilcox Vølund A/S, Esbjerg (DK)

( * ) Notice: Subject to any disclaimer, the term of this patent is extended or adjusted under 35 U.S.C. 154(b) by 793 days.

(21) Appl. No.: 12/306,573

(22) PCT Filed: Jun. 29, 2007

(86) PCT No.: PCT/IB2007/001793
§ 371 (c)(1),
(2), (4) Date: Aug. 31, 2009

(87) PCT Pub. No.: WO2008/004070
PCT Pub. Date: Jan. 10, 2008

(65) Prior Publication Data
US 2009/0308334 A1    Dec. 17, 2009

(30) Foreign Application Priority Data
Jun. 30, 2006    (EP) ..................................... 06013600

(51) Int. Cl.
*C01B 3/36*    (2006.01)
*C01B 6/24*    (2006.01)
*C01B 3/24*    (2006.01)
*C10J 3/00*    (2006.01)
*B01J 7/00*    (2006.01)

(52) U.S. Cl. ............ 48/197 R; 48/61; 48/210; 423/644; 423/648.1; 423/650

(58) Field of Classification Search .......... 48/61, 197 R; 423/644, 648.1, 650
See application file for complete search history.

(56) References Cited

U.S. PATENT DOCUMENTS 3,884,649 A * 5/1975 Matthews ....................... 48/202
6,112,677 A    9/2000 Kuntschar et al.
(Continued)

FOREIGN PATENT DOCUMENTS
EP          1 662 114          5/2006
(Continued)

OTHER PUBLICATIONS

Official Action of corresponding Russian Application No. 2009102976/15(003852), Mar. 5, 2011, Russian Patent Office, Russia.
Lyamin, V.A., "Wood Gasification", Moscow, Forest Industry, 1967, p. 27, table 8; pp. 153,154, Fig. 34.

*Primary Examiner* — Matthew Merkling
(74) *Attorney, Agent, or Firm* — Stites & Harbison PLLC; Marvin Petry

(57) ABSTRACT

A method of controlling an apparatus for generating electric power and apparatus for use in said method, the apparatus comprising a gasifier for biomass material, such as waste, wood chips, straw, etc., said gasifier being of the shaft and updraft fixed bed type, which from the top is charged with the raw material for gasification and into the bottom of which gasifying agent is introduced, and a gas engine driving an electrical generator for producing electrical power, said gas engine being driven by the fuel gas from the gasifier. By supplying the produced fuel gas directly from the gasifier to the gas engine and controlling the production of the fuel gas in the gasifier in order to maintain a constant electrical output power, the necessity of using a gas holder between the gasifier and the gas engine is avoided.

11 Claims, 2 Drawing Sheets

U.S. PATENT DOCUMENTS

| | | |
|---|---|---|
| 6,911,058 B2 | 6/2005 | Calderon et al. |
| 7,105,088 B2 | 9/2006 | Schien et al. |
| 7,290,403 B2 | 11/2007 | Peyron |
| 2002/0095866 A1 * | 7/2002 | Hassett .................... 48/199 FM |
| 2003/0221432 A1 | 12/2003 | Tucker |
| 2004/0168468 A1 * | 9/2004 | Peyron ........................... 62/656 |

FOREIGN PATENT DOCUMENTS

| | | |
|---|---|---|
| FR | 2 844 804 | 3/2004 |
| GB | 2 331 128 | 5/1999 |
| RU | 48680 | 10/2005 |
| RU | 2004108243 | 10/2005 |

\* cited by examiner

METHOD OF CONTROLLING AN APPARATUS FOR GENERATING ELECTRIC POWER AND APPARATUS FOR USE IN SAID METHOD

TECHNICAL FIELD

The present invention relates to a method of controlling an apparatus for generating electric power and apparatus for use in said method, said apparatus comprising a gasifier for biomass material, such as waste, wood chips, straw, etc., said gasifier being of the shaft and updraft, fixed bed type, which from the top is charged with the raw material for gasification and into the bottom of which gasifying agent is introduced, and a gas engine driving an electrical generator for producing electrical power, said gas engine being driven by the fuel gas produced in the gasifier.

BACKGROUND ART

In such apparatus for generating electric power, it is known to use a gas holder between the gasifier and the gas engine or other equipment utilized in the fuel gas produced in order to be able to control the production and use separately and compensate for fluctuations in fuel gas production and thus maintain a constant electrical output power.

From FR 2,844,804 it is known to use the gas provided in a downdraft gasifier as fuel for a gas engine producing electrical power. The produced gas is furthermore used as fuel for a burner for heating purposes. Varying gas production is stated to be partially taken up by the mechanical inertia of the gas engine. Obviously, such varying gas production can also be taken up by varying the supply of gas to the burner. One major disadvantage of the downdraft gasifier is that the produced gas is delivered at a high temperature of approximately 500-650° C., which has to be cooled down immediately in order to reduce explosion risk. After cooling down, several further steps of cleaning, scrubbing and filtering are performed before the gas can be used in the gas engine. This document furthermore specifies that the biomass fuel delivered to the gasifier is dewatered, dried and pelletized biomass having a well-defined moisture content of 10-25%. Nothing is indicated in this document relating to the specification of the gasifying agent except that atmospheric air is used for drying, pyrolysis, reduction and oxidation.

From US 2004/0168468 A1 and GB 2 331 128 A it is known to deliver gas from a high-pressure gasifier to a gas turbine producing electricity. The high-pressure gasifiers are suited for gasifying particulate fossil fuels such as coal or residues from petroleum industry, and produce fuel gas at a high temperature in the range of 500-1000° C. A main disadvantage with such high-pressure gasifiers is that the gasifier confinement has to be a pressure vessel, and that supply of fuel and gasifying agent to the gasifier has to be performed at the high pressure of the gasifier, thus involving use of high-pressure compressors for delivery thereof.

US 2004/0168468 A1 describes an automatic up- and down-variation of the solid-fuel feed flow to the gasifier based on the monitored output electric generator output. Furthermore, this document describes a sophisticated and complicated air separation system, where the air is separated in two streams consisting of $N_2$ and $O_2$, respectively, in order to provide pure oxygen as gasifying agent in the high-pressure, high-temperature gasifier, and in the combustion device, i.e. the gas turbine, the separated $N_2$ is introduced in order to cool down the gas turbine GB 2, 331, 128 A uses a high-pressure buffer flue gas storage, or as an alternative the high-pressure gasifier system itself is used as a buffer gas storage.

DISCLOSURE OF THE INVENTION

Based on the above prior art, it is an object of the present invention to provide a simplified method and apparatus of the kind referred to above, by which it is possible to deliver the product gas in controlled amounts directly to the gas engine without the necessity of using a gas holder to compensate for varying production of fuel gas in the updraft gasifier and thus delivering controlled electrical power in accordance with varying requirements, and this is obtained by directly supplying the fuel gas from the gasifier, with suitable cooling and filtering equipment inserted, to the gas engine and by controlling the production of fuel gas in order to maintain a constant and/or controlled electrical output. The control of the fuel gas production can be performed by controlling the amount of gasifying agent supplied to the gasifier.

Compared to the high-pressure gasifiers, the updraft gasifier, working close to atmospheric pressure, is a much simpler and less costly mechanical device and uses low-cost, low-value biomass materials, such as waste, wood chips, straw, etc. for gasification.

The updraft gasifier is suited for non-homogeneous biomass fuel with high-moisture contents and produces fuel gas at a very low temperature, and the gasification can be controlled by controlling the gasifying agent being injected into the bottom of the gasifier. Thus, the constant electricity production is controlled by varying in a controlled manner and dynamically the quantity and parameters of the gasifying agent, and thereby the subsequent quantity of produced fuel gas is supplied directly and consumed 100% instantly by the gas engine driving the electric generator.

The control is preferably performed by comparing a set desired electrical output power with the actual power production from the gas engine and electrical generator, and if a deviation is present, this deviation is reduced by controlling the fuel gas from the gasifier a little up or down in order to maintain the desired set output power. This adjustment is e.g. provided by means of a simple gas control valve varying the fuel gas flow into the gas engine, and such adjustment will be followed by the subsequent automatic variation of gasifying agent added to the gasifier.

BRIEF DESCRIPTION OF THE DRAWINGS

In the following, detailed part of the present description, the invention will be explained in more detail with reference to the exemplary embodiment of an apparatus for generating electric power according to the invention shown in the drawings, in which FIG. 1 schematically shows an embodiment of an apparatus for generating electric power in accordance with the present invention.

DESCRIPTION OF THE PREFERRED EMBODIMENT

Figure 1:
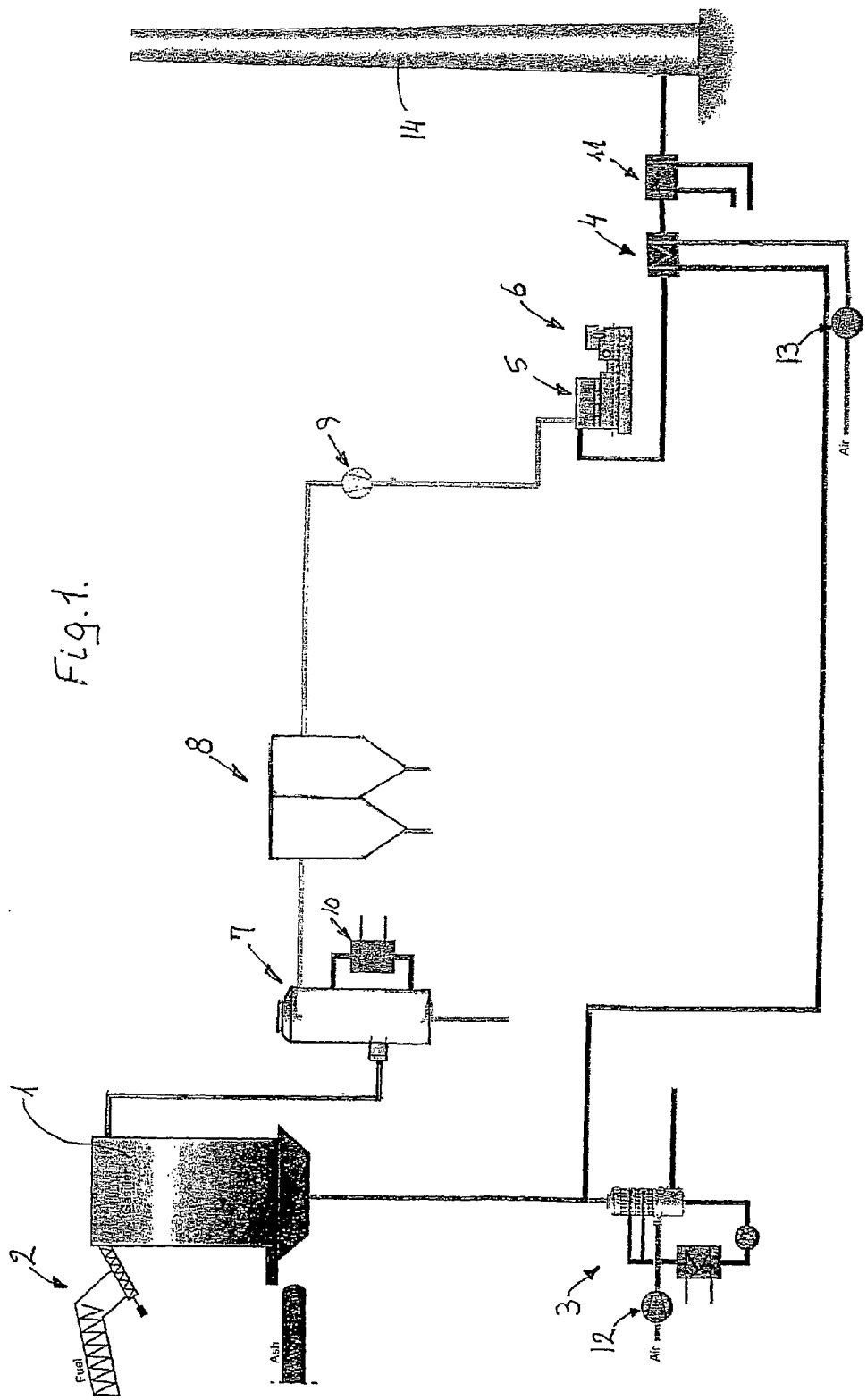

The apparatus for generating electric power shown in FIG. 1 comprises a gasifier 1 of the shaft and updraft fixed bed type, in which raw material for gasification is charged from the top by means of a charging conveyor 2. Gasifying agent is introduced from the bottom of the gasifier 1 and the gasifying agent comprises humidified and preheated air delivered from a humidifier 3 and a preheater 4. The gas produced in the gasifier 1 is delivered to a gas engine 5 driving a generator 6 for producing electrical power. Gas cleaning equipment in the form of a gas cooling system 7 and an electrostatic precipitator 8 is provided between the gasifier 1 and the gas engine 5 in order to provide a clean gas for the gas engine 5. Furthermore, a fan 9 increases the pressure of the fuel gas delivered to the gas engine 5, said fan 9 being controlled to deliver a constant pressure and being followed by a gas control valve varying the fuel gas flow for this purpose. The gas cooling system 7 is connected to a heat exchanger 10 in order to utilize the energy removed from the gas in the gas cooling system 7. The heat exchanger 10 may be integrated in the gas cooling system 7 and the gas cooling system 7 may comprise a further gas cooling tower in order to reduce the temperature of the fuel gas and extract further condensate from the fuel gas. Condensate from the gas cooling system 7 is taken out therefrom and possibly utilized as supply water for the humidifier 3 after cleaning, such cleaning possibly including separation of tar and other combustible condensate products. The electrostatic precipitator 8 removes possible further particles/aerosols present in the fuel gas before delivery to the gas engine 5. The exhaust gas from the gas engine 5 may be utilized in the preheater 4 for preheating air for use as gasifying agent and possible further heat may be extracted in a separate heat exchanger 11 before delivery of the exhaust gases to the flue stack 14. The preheated secondary air from the heat exchanger 4 is delivered to the bottom of the gasifier 1, either directly, as shown in FIG. 1, or in combination with primary air humidified in a humidifier 3 possibly comprising a separate air fan and a water circulation system, in which the water is heated, possibly using the excess heat from the gas cooling system 7 via the heat exchanger 10 and/or the excess heat from the exhaust gas from the gas engine 5 delivered from the heat exchanger 11.

The gasifying agent in the form of humidified primary air and secondary air is delivered to the bottom of the gasifier in controlled amount by controlling the separate fans 12, 13 for primary air and secondary air, respectively, and the humidification is controlled by controlling the heat delivered to the circulated water in the humidifier 3, whereby a controlled amount of gasifying agent having a controlled humidity can be delivered to the gasifier 1.

Figure 2:
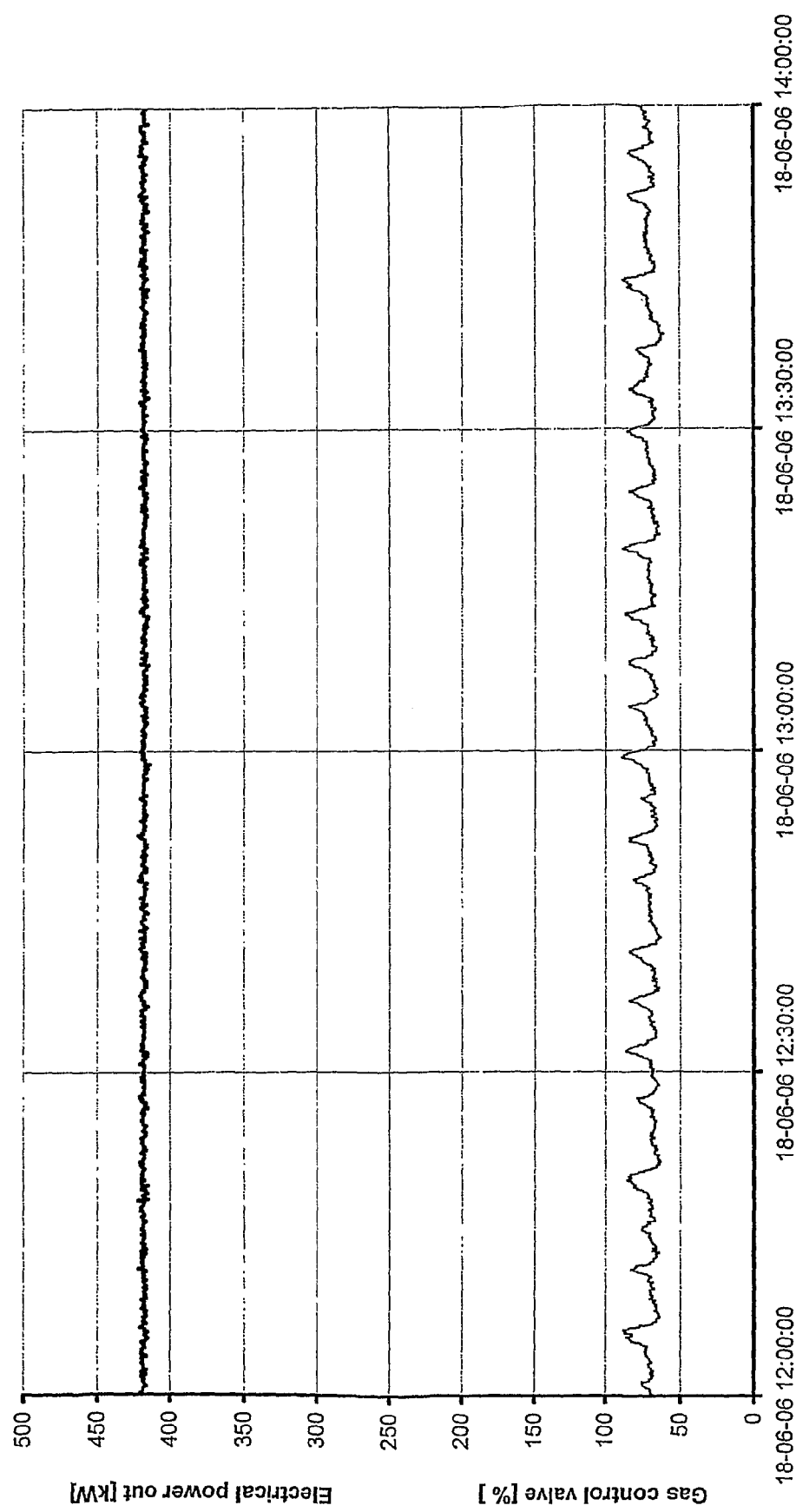
FIG. 2 is a curve diagram showing the stable production of electric power by varying the gas control valve opening.

As shown in FIG. 2, the typical electrical power production curve over time indicates that a constant electrical power can be maintained over a substantial period. The periodical variations in the gas control valve position are related to periodic infeed of biomass material by the charging conveyor 2.

Typical parameters for the primary air is water-saturated air at 70° C. and for secondary air dry air at 400° C., said primary air and secondary air being mixed for use as gasifying agent at 120° C.

During operation, the gas engine 5 and the generator 6 are controlled to deliver the desired electrical power, and the fan 9 is controlled to deliver fuel gas to the gas engine 5 at a constant pressure. Furthermore, the gasifier 1 is controlled by means of the fans 12, 13 for primary air and secondary air, respectively, to deliver fuel gas at the top of the gasifier at a constant pressure, said pressure preferably being maintained close to the ambient atmospheric pressure, preferably at 0-5 mm WG and more preferably at 0-1 mm WG below the ambient atmospheric pressure. In other words, controlling of the generated power is performed by the control of the position of the gas control valve. Changes in the position of this gas control valve induce a change in the control of the fan 9 maintaining a constant pressure to this gas control valve, and this will induce a change of the speed of the fans 12, 13 for primary and secondary air, respectively, in order to maintain the constant pressure of the delivered fuel gas at the top of the gasifier. By this mode of controlling the fixed bed updraft gasifier, the following functional parameters have been obtained:

Control range of generated electrical power: 10%-100% of maximum power.

Increase rate of generated electrical power: Approx. 10% of maximum power/minute.

Decrease rate of generated electrical power: Approx. 35% of maximum power/minute.

Less than 10% of maximum power may theoretically be controlled, but this would be without practical interest due to a relatively high heat loss, etc.

The two fans 12, 13 for primary and secondary air, respectively, are controlled individually in order to optimize the gasification in the gasifier 1 providing the gasifying agent having a temperature and humidity optimized to the process. Said parameters will evidently depend on the delivered biomass material from the charging conveyor 2, i.e. the humidity of said biomass material and the constituents thereof. The infeed of biomass by the charging conveyor 2 is controlled to maintain a substantially constant level of the biomass in the gasifier, e.g. by having a levelling impeller at the top of the gasifier distributing the biomass over the upper surface thereof, and controlling the charging conveyor 2 in dependence of the resistance encountered by the levelling impeller. At the bottom of the gasifier 1, ashes are taken out and disposed of in the normal way. Preferably the gasifier 1 is controlled in such a way that the temperature of the fuel gas at the top of the gasifier is below 100° C., typically approximately 75° C.

Above, the invention has been described in connection with a preferred embodiment thereof, however, many modifications may be envisaged without departing from the following claims, such deviations among others including the use of more than one gas engine 5 and generator 6 for producing electrical power and possible use of some of the fuel gas from the gasifier in a boiler for producing district heating, said boiler possibly using fuel gas directly from the gasifier without gas cleaning. Furthermore, the condensate from the gas cooling system 7 being tar water may be cleaned by separating tar from the water and cleaning the water, as described in European patent No. 1,395,519 owned by the applicant of the present application. The separated tar may be used as fuel or used as raw material for gasification. Further heat exchangers may be inserted after the heat exchanger 11 and between the gas cooling system 7 and the electrostatic precipitator 8 in order to obtain a suitably low exhaust gas temperature in the stack 14 and at the electrostatic precipitator 8, respectively. The heat extracted in the several heat exchangers may be used for district heating. Typical temperature of the fuel gas at the entrance to the electrostatic precipitator 8 is 35° C. and at the outlet therefrom 400° C., and the fan 9 will raise the temperature further to approx. 60° C. at the delivery to the gas engine, thus avoiding any risk of condensation of the fuel gas. The temperature of the gasification medium is, as described above, typically 120° C., however, the temperature may be varied in the interval from 70° C. to 400° C. As described above, the gasification medium is comprised of primary air and secondary air, however, this gasification medium may be supplemented with up to 50% recirculated flue gas or exhaust gas, which contains $CO_2$ and $H_2O$, which contribute to the gasification process.

The invention claimed is:

1. A method of controlling an apparatus for generating electric power, which apparatus comprises a gasifier for biomass material, such as waste, wood chips, straw, etc., which is of the shaft and updraft fixed bed type, which from the top is charged with the raw material for gasification and into the bottom of which gasifying agent is introduced, and a gas engine driving an electrical generator for producing electrical power, the gas engine being driven by the fuel gas from the gasifier, said method comprising the following steps;
supplying the produced fuel gas directly from the gasifier to the gas engine without employing a gas holder, and
controlling the production of the fuel gas in the gasifier in order to maintain a set desired constant electrical output power,
wherein the controlling of the production of the fuel gas comprises the steps of;
controlling the generated power by control of the position of a gas control valve inserted between the gasifier and the gas engine,
controlling a fan inserted between the gasifier and the gas control valve to maintain a constant pressure to the gas control valve, and
controlling the supply of gasifying agent in order to maintain a constant pressure of the fuel gas delivered at the top of the gasifier to the fan.

2. A method in accordance with claim 1, comprising the further step of maintaining the temperature of the fuel gas at the top of the gasifier at a preset level by individually controlling separate fans for supplying primary and secondary air, respectively, as gasifying agent.

3. A method in accordance with claim 2, including the step of maintaining the temperature of the fuel gas at the top of the gasifier below 100° C.

4. A method in accordance with claim 1, including controlling the supply of primary and secondary air, respectively, and maintaining the pressure of the fuel gas at the top of the gasifier at a constant pressure close to the ambient atmospheric pressure.

5. A method in accordance with claim 1, further including the step of,
maintaining the temperature of the fuel gas at the top of the gasifier below 100° C. by individually controlling the speed of fans for primary air and secondary air, respectively.

6. A method in accordance with claim 1, the gasifying agent being heated air and maintaining a constant content of water vapour in said heated air.

7. A method in accordance with claim 1, wherein the gasifying agent further comprises recirculated flue gas or exhaust gas.

8. A method in accordance with claim 6, wherein the constant content of water vapour is maintained by introducing the heated air into an installation having a controlled moisture and a constant temperature.

9. A method in accordance with claim 1, wherein the fuel gas pressure at the top of the gasifier is maintained at 0-5 mm WG, preferably 0-1 mm WG below the ambient atmospheric pressure.

10. A power generation plant comprising
a gasifier for gasification of biomass, such as waste, wood chips, straw, etc., said gasifier being of the shaft and updraft fixed bed type, in which raw material to be gasified is supplied from the top, and the gasifying agent is supplied from the lower part, and
a gas engine driven by the fuel gas produced in said gasifier and connected to an electric power generator for generating electrical power,
wherein said gas engine is connected directly to the outlet from said gasifier without employing a gas holder and the gasifier is controlled by a method in accordance with claim 1.

11. A power generating plant in accordance with claim 10, including a closed-loop controller for controlling each of the method steps.

* * * * *